United States Patent
Arima et al.

(10) Patent No.: US 12,073,999 B2
(45) Date of Patent: Aug. 27, 2024

(54) ELECTROLYTIC CAPACITOR AND METHOD FOR PRODUCING SAME

(71) Applicant: Panasonic Intellectual Property Management Co., Ltd., Osaka (JP)

(72) Inventors: Hiroyuki Arima, Osaka (JP); Takehiro Kobayashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/813,606

(22) Filed: Jul. 20, 2022

(65) Prior Publication Data

US 2022/0367120 A1    Nov. 17, 2022

Related U.S. Application Data

(63) Continuation of application No. PCT/JP2021/003301, filed on Jan. 29, 2021.

(30) Foreign Application Priority Data

Jan. 31, 2020    (JP) ................................ 2020-015780

(51) Int. Cl.
    *H01G 9/025*    (2006.01)
    *H01G 9/00*    (2006.01)
    *H01G 9/035*    (2006.01)

(52) U.S. Cl.
    CPC ........... *H01G 9/025* (2013.01); *H01G 9/0036* (2013.01); *H01G 9/035* (2013.01)

(58) Field of Classification Search
    None
    See application file for complete search history.

(56) References Cited

U.S. PATENT DOCUMENTS

| | | | |
|---|---|---|---|
| 9,875,852 B2* | 1/2018 | Asteman | H01G 9/042 |
| 2014/0092529 A1 | 4/2014 | Nobuta et al. | |
| 2014/0168857 A1* | 6/2014 | Sautter | H01G 9/028 |
| | | | 427/80 |
| 2014/0328007 A1 | 11/2014 | Endo | |
| 2015/0255221 A1 | 9/2015 | Asteman et al. | |

FOREIGN PATENT DOCUMENTS

| | | |
|---|---|---|
| CN | 104662628 A | 5/2015 |
| JP | 2015-532525 | 11/2015 |
| JP | 2016-102190 | 6/2016 |
| JP | 2019-054147 | 4/2019 |
| WO | 2012/117994 | 9/2012 |
| WO | 2013/081099 | 6/2013 |

OTHER PUBLICATIONS

International Search Report of PCT application No. PCT/JP2021/003301 dated Mar. 30, 2021.
English Translation of Chinese Office Action dated Jun. 4, 2024 for the related Chinese Patent Application No. 202180011097.4.

* cited by examiner

*Primary Examiner* — Eric W Thomas
(74) *Attorney, Agent, or Firm* — Rimon P.C.

(57) ABSTRACT

An electrolytic capacitor includes a capacitor element. The capacitor element includes an anode body and an electrolyte layer. The anode body has a dielectric layer on a surface of the anode body. The electrolyte layer is disposed to be adjacent to the dielectric layer. The electrolyte layer contains a first conductive polymer and a non-aqueous solvent. The first conductive polymer is a self-doped conductive polymer.

6 Claims, 2 Drawing Sheets

ELECTROLYTIC CAPACITOR AND METHOD FOR PRODUCING SAME

BACKGROUND

1. Technical Field

The present disclosure relates to an electrolytic capacitor and a method for manufacturing an electrolytic capacitor.

2. Description of the Related Art

Capacitors used in electronic devices are required to have a large capacitance and a low equivalent series resistance (ESR) in a high frequency region. Promising candidates as large capacitance, and low ESR capacitors are electrolytic capacitors including a conductive polymer such as polypyrrole, polythiophene, polyfuran, or polyaniline. International Publication WO 2012/117994 discloses, as a conductive polymer solution for forming a solid electrolyte layer, "a conductive polymer solution containing: a conductive polymer, polysulfonic acid or a salt thereof which functions as a dopant to the conductive polymer, a mixture of a polyacid and a carbon material, and a solvent" (Claim 1 of International Publication WO 2012/117994). International Publication WO 2012/117994 discloses a solid electrolytic capacitor manufactured using the conductive polymer solution.

SUMMARY

An aspect of the present disclosure relates to an electrolytic capacitor. The electrolytic capacitor is an electrolytic capacitor including a capacitor element. The capacitor element includes an anode body and an electrolyte layer. The anode body has a dielectric layer on a surface of the anode body. The electrolyte layer is disposed adjacent to the dielectric layer. The electrolyte layer contains a first conductive polymer and a non-aqueous solvent. The first conductive polymer is a self-doped conductive polymer.

Another aspect of the present disclosure relates to a method for manufacturing an electrolytic capacitor. The manufacturing method includes: a step (i) of preparing a capacitor element precursor that includes an anode body having a dielectric layer on a surface of the anode body; a step (ii) of forming a polymer layer containing a first conductive polymer to be adjacent to the dielectric layer by an impregnation treatment, the first conductive polymer being a self-doped conductive polymer; and a step (iii) of impregnating the polymer layer with a non-aqueous solvent.

According to the present disclosure, an electrolytic capacitor having a low increase ratio of ESR over a long period of time can be obtained.

DETAILED DESCRIPTIONS OF EMBODIMENTS

Figure 1:
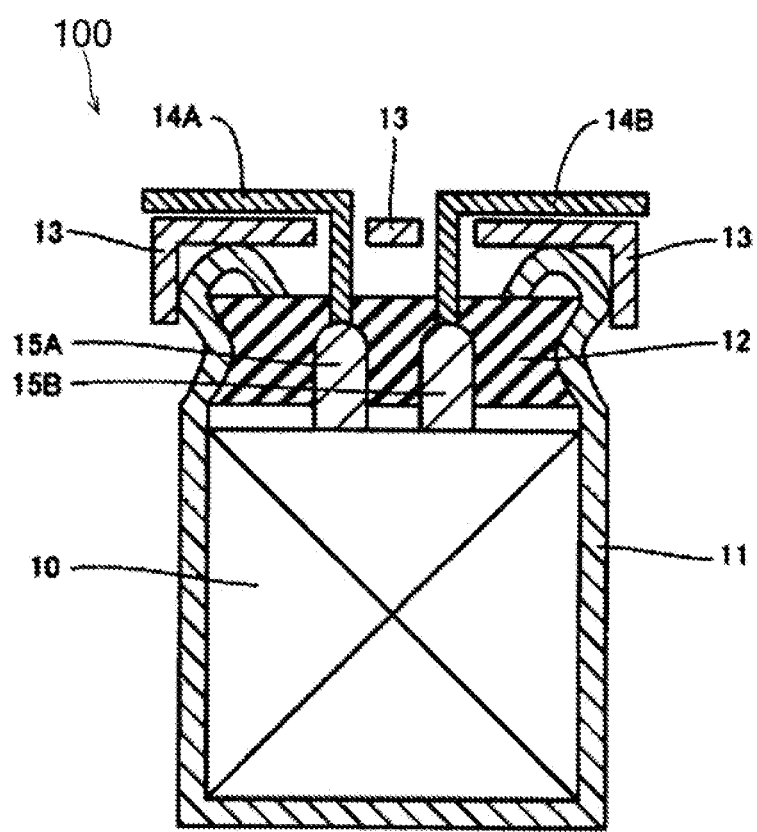
FIG. 1 is a sectional view schematically illustrating an example of an electrolytic capacitor of the present disclosure.

Currently, an electrolytic capacitor having a low increase ratio of ESR over a long period of time is required. In such a circumstance, the present disclosure provides an electrolytic capacitor having a low increase ratio of ESR over a long period of time.

Hereinafter, an exemplary embodiment of the present disclosure will be described with reference to examples, but the present disclosure is not limited to the examples described below. In the following description, specific numerical values and materials may be provided as examples, but other numerical values and materials may be applied as long as the effect of the present disclosure can be obtained.

(Electrolytic Capacitor)

An electrolytic capacitor of the present disclosure includes a capacitor element. The capacitor element includes an anode body that has a dielectric layer on a surface of the anode body and an electrolyte layer that is disposed to be adjacent to the dielectric layer. The electrolyte layer contains a self-doped first conductive polymer and a non-aqueous solvent.

The capacitor element may include a foil-shaped anode body having a dielectric layer on a surface of the anode body, a foil-shaped cathode body, a separator disposed between the anode body and the cathode body, and an electrolyte layer disposed between the anode body and the cathode body. Such a capacitor element may be referred to "first capacitor element" below. The first capacitor element may be a wound type or may be a laminated type. In an example of the wound-type capacitor element, a foil-shaped anode body, a foil-shaped cathode body, and a separator are wound to dispose the separator disposed between the anode body and the cathode body. In an example of a laminated-type capacitor element, a foil-shaped anode body, a foil-shaped cathode body, and a separator are folded in a zigzag manner so as to dispose the separator between the anode body and the cathode body.

Alternatively, the capacitor element may include a porous anode body that has a dielectric layer on a surface of the anode body, a cathode layer, and an electrolyte layer disposed between the anode body and the cathode layer. Such a capacitor element may be referred to "second capacitor element" below. In the first and second capacitor elements, the electrolyte layer is adjacent to the dielectric layer of the anode body.

The electrolyte layer may further contain a second conductive polymer doped with a dopant.

The first and second conductive polymers contained in the electrolyte layer will be described below. In this specification, the conductive polymer may be read as a conductive polymer.

(First Conductive Polymer)

The first conductive polymer is a self-doped conductive polymer. The self-doped conductive polymer described herein means a polymer in which a functional group functioning as a dopant is directly or indirectly bonded to the skeleton of the conductive polymer by a covalent bond. Examples of the functional group functioning as a dopant include anionic groups. The anionic group is a group that has a negative charge by dissociation of a cation. The anionic group may be at least one selected from the group consisting of a sulfonic acid group, a phosphorus acid group, a phosphonic acid group, and a carboxyl group, and may be a salt thereof (a salt with an inorganic base, a salt with an organic base, or the like). A preferred example of the anionic group is a sulfonic acid group or a salt thereof.

The number of the functional group (for example, an anionic group) functioning as a dopant per one structural unit constituting the polymer may range from 0.2 to 3, inclusive, may range from 0.5 to 2, inclusive, or may be 1.

The first conductive polymer may be used singly or in combination of two or more kinds thereof.

Examples of the skeleton of the first conductive polymer include polypyrrole, polythiophene, and polyaniline. An atomic group (for example, a functional group) other than the functional group functioning as a dopant may be bonded to these skeletons.

Examples of the first conductive polymer include polypyrrole (polypyrrole and a derivative thereof) having an anionic group, polythiophenes (polythiophene and a derivative thereof) having an anionic group, and polyanilines (polyaniline and a derivative thereof) having an anionic group. In these examples, a preferred example of the anionic group is a sulfonic acid group or a salt thereof. The first conductive polymer may be a copolymer of two or more types of monomers.

From the viewpoint of attaining a high effect of suppressing an increase in ESR and a decrease in capacitance even in a high-temperature environment, the first conductive polymer may be a compound in which an atomic group containing a sulfonic acid group is introduced into poly(3, 4-ethylenedioxythiophene) (PEDOT). For example, the first conductive polymer may a polymer including the constituent unit shown by the following chemical formula, or may be a polymer constituted by the constituent unit shown by the following chemical formula.

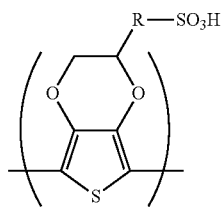

In the above formula, R represents an organic chain. R may be constituted by a hydrocarbon chain, or may contain an ether bond, a branched alkyl group, or other substituents in addition to the hydrocarbon chain. In the above formula, the sulfonic acid group may be a salt. Examples of R include (skeleton side)-$CH_2$—O—$(CH_2)_2$—$(CHCH_3)$-(sulfonic acid group side).

Alternatively, the first conductive polymer may be a compound in which an atomic group containing a sulfonic acid group is introduced into polyaniline, and may be, for example, polyaniline sulfonic acid.

The weight average molecular weight of the first conductive polymer may range from 1000 to 100000, inclusive or may range from 1000 to 30000, inclusive.

(Second Conductive Polymer)

The second conductive polymer is a polymer whose conductivity is improved by the polymer being doped with a dopant. Examples of the second conductive polymer include polypyrrole, polythiophene, polyfuran, polyaniline, polyacetylene, and derivatives thereof. The derivatives include polymers having polypyrrole, polythiophene, polyfuran, polyaniline, and polyacetylene as a basic skeleton. For example, the derivative of polythiophene includes poly(3,4-ethylenedioxythiophene) and the like. The second conductive polymer may be used singly or in combination of two or more kinds thereof. The second conductive polymer may be a copolymer of two or more types of monomers. The weight average molecular weight of the second conductive polymer is not particularly limited, and may range, for example, from 1000 to 100000, inclusive. A preferred example of the second conductive polymer is poly(3,4-ethylenedioxythiophene) (PEDOT).

Unlike the first conductive polymer, in the second conductive polymer, a functional group functioning as a dopant is not covalently bonded to the skeleton of the conductive polymer. The second conductive polymer is doped with a dopant. It is preferable to use a polymer dopant, in view of suppressing the dedoping of the dopant from the second conductive polymer. Examples of the polymer dopant include polyvinylsulfonic acid, polystyrenesulfonic acid, polyallylsulfonic acid, polyacrylsulfonic acid, polymethacrylsulfonic acid, poly(2-acrylamido-2-methylpropanesulfonic acid), polyisoprenesulfonic acid, and polyacrylic acid. These may be used singly or in combination of two or more kinds thereof. These may be contained in the electrolyte layer in the form of a salt. A preferred example of the dopant is polystyrenesulfonic acid (PSS).

The weight average molecular weight of the dopant is not particularly limited. From the viewpoint of facilitating the formation of a homogeneous electrolyte layer, the weight average molecular weight of the dopant may range from 1000 to 100000, inclusive.

In the electrolytic capacitor of the present disclosure, the dopant may be polystyrenesulfonic acid, and the second conductive polymer may be poly(3,4-ethylenedioxythiophene). That is, the electrolyte layer may contain poly(3,4-ethylenedioxythiophene) doped with polystyrenesulfonic acid.

(Liquid Component)

The electrolyte layer of the electrolytic capacitor of the present disclosure contains a non-aqueous solvent. The electrolyte layer may contain an electrolytic solution (non-aqueous electrolytic solution) containing a non-aqueous solvent and a base component (base) dissolved in the non-aqueous solvent. That is, the electrolyte layer of the electrolytic capacitor in the present disclosure may contain a liquid component. Hereinafter, the liquid component (non-aqueous solvent or electrolytic solution) contained in the electrolyte layer may referred to "liquid component (L)". In this specification, the liquid component (L) may be a component that is a liquid at room temperature (25° C.), or may be a component that is a liquid at a temperature at which the electrolytic capacitor is used. The electrolytic capacitor having the electrolyte layer containing the liquid component (L) may be referred to as a hybrid capacitor.

The non-aqueous solvent contained in the electrolyte layer may be an organic solvent or may be an ionic liquid. Examples of the non-aqueous solvent include polyhydric alcohols such as ethylene glycol and propylene glycol, cyclic sulfones such as sulfolane (SL), lactones such as γ-butyrolactone (γBL), amides such as N-methylacetamide, N,N-dimethylformamide, and N-methyl-2 pyrrolidone, esters such as methyl acetate, carbonate compounds such as propylene carbonate, ethers such as 1,4-dioxane, ketones such as methyl ethyl ketone, and formaldehyde.

As the non-aqueous solvent, a polymer solvent may be used. Examples of the polymer solvent include polyalkylene glycol, a derivative of the polyalkylene glycol, and a compound obtained by substituting at least one hydroxyl group of a polyhydric alcohol with polyalkylene glycol (including a derivative). Specific examples of the polymer solvent include polyethylene glycol (PEG), polyethylene glycol glyceryl ether, polyethylene glycol diglyceryl ether, polyethylene glycol sorbitol ether, polypropylene glycol, polypropylene glycol glyceryl ether, polypropylene glycol diglyceryl ether, polypropylene glycol sorbitol ether, and polybutylene glycol. Further, examples of the polymer solvent include an ethylene glycol-propylene glycol copolymer, an ethylene glycol-butylene glycol copolymer, and a propylene glycol-butylene glycol copolymer. One of these non-aqueous solvents may be used singly, or two or more thereof may be used in mixture.

As described above, the electrolyte layer may contain a non-aqueous solvent and a base component (base) dissolved in the non-aqueous solvent. The electrolyte layer may contain a non-aqueous solvent and a base component and/or an acid component (acid) dissolved in the non-aqueous solvent.

As the acid component, a polycarboxylic acid and a monocarboxylic acid can be used. Examples of the polycarboxylic acid include aliphatic polycarboxylic acids ([saturated polycarboxylic acids such as oxalic acid, malonic acid, succinic acid, glutaric acid, adipic acid, pimelic acid, suberic acid, azelaic acid, sebacic acid, 1,6-decanedicarboxylic acid, and 5,6-decanedicarboxylic acid]; and [unsaturated polycarboxylic acids such as maleic acid, fumaric acid, and itaconic acid]), aromatic polycarboxylic acids (such as phthalic acid, isophthalic acid, terephthalic acid, trimellitic acid, and pyromellitic acid), and alicyclic polycarboxylic acids (such as cyclohexane-1,2-dicarboxylic acid and cyclohexene-1,2-dicarboxylic acid).

Examples of the monocarboxylic acid include aliphatic monocarboxylic acids (1 to 30 carbon atoms) ([saturated monocarboxylic acids such as formic acid, acetic acid, propionic acid, butyric acid, isobutyric acid, valeric acid, caproic acid, enanthic acid, caprylic acid, pelargonic acid, lauric acid, myristic acid, stearic acid, and behenic acid]; and [unsaturated monocarboxylic acids such as acrylic acid, methacrylic acid, and oleic acid]), aromatic monocarboxylic acids (such as benzoic acid, cinnamic acid, and naphthoic acid), and oxycarboxylic acids (such as salicylic acid, mandelic acid, and resorcinol acid).

Among these, maleic acid, phthalic acid, benzoic acid, pyromellitic acid, and resorcinol acid are thermally stable, and are preferably used.

As the acid component, an inorganic acid may be used. Typical examples of the inorganic acid include phosphoric acid, phosphorous acid, hypophosphorous acid, alkyl phosphoric acid ester, boric acid, fluoroboric acid, tetrafluoroboric acid, hexafluorophosphoric acid, benzenesulfonic acid, and naphthalenesulfonic acid. As the acid component, a composite compound of an organic acid and an inorganic acid may be used. Examples of such a composite compound include borodiglycolic acid, borodioxalic acid, and borodisalicylic acid.

The base component may be a compound having an alkyl-substituted amidine group, and may be, for example, an imidazole compound, a benzimidazole compound, an alicyclic amidine compound (a pyrimidine compound and an imidazoline compound), and the like. Specifically, preferred are 1,8-diazabicyclo[5,4,0]undecene-7,1,5-diazabicyclo[4,3,0]nonene-5, 1,2-dimethylimidazolinium, 1,2,4-trimethylimidazoline, 1-methyl-2-ethyl-imidazoline, 1,4-dimethyl-2-ethylimidazoline, 1-methyl-2-heptylimidazoline, 1-methyl-2-(3'heptyl)imidazoline, 1-methyl-2-dodecylimidazoline, 1,2-dimethyl-1,4,5,6-tetrahydropyrimidine, 1-methylimidazole, and 1-methylbenzimidazole. A capacitor excellent in impedance performance is obtained by using these components.

As the base component, a quaternary salt of a compound having an alkyl-substituted amidine group may be used. Examples of such a base component include an imidazole compound, a benzimidazole compound, and an alicyclic amidine compound (a pyrimidine compound or an imidazoline compound) that are quaternized by an alkyl group or an arylalkyl group having 1 to 11 carbon atoms. Specifically, preferred are 1-methyl-1,8-diazabicyclo[5,4,0]undecene-7, 1-methyl-1,5-diazabicyclo[4,3,0]nonene-5, 1,2,3-trimethylimidazolinium, 1,2,3,4-tetramethylimidazolinium, 1,2-dimethyl-3-ethyl-imidazolinium, 1,3,4-trimethyl-2-ethylimidazolinium, 1,3-dimethyl-2-heptylimidazolinium, 1,3-dimethyl-2-(3'heptyl)imidazolinium, 1,3-dimethyl-2-dodecylimidazolinium, 1,2,3-trimethyl-1,4,5,6-tetrahydropyrimidium, 1,3-dimethylimidazolium, 1-methyl-3-ethyl-imidazolium, and 1,3-dimethylbenzimidazolium. A capacitor excellent in impedance performance is obtained by using these components.

A tertiary amine may be used as the base component. Examples of the tertiary amine include trialkylamines (such as trimethylamine, dimethylethylamine, methyldiethylamine, triethylamine, dimethyl-n-propylamine, dimethylisopropylamine, methylethyl-n-propylamine, methylethylisopropylamine, diethyl-n-propylamine, diethylisopropylamine, tri-n-propylamine, triisopropylamine, tri-n-butylamine, and tri-tert-butylamine) and phenyl group-containing amines (such as dimethylphenylamine, methylethylphenylamine, and diethylphenylamine). Among them, trialkylamines are preferable in terms of high conductivity of the electrolyte layer, and it is more preferable to contain at least one selected from the group consisting of trimethylamine, dimethylethylamine, methyldiethylamine, and triethylamine. As the base component, a secondary amine such as dialkylamines, a primary amine such as a monoalkylamine, or ammonia may also be used.

The liquid component (L) may contain a salt of an acid component with a base component. The salt may be an inorganic salt and/or an organic salt. The organic salt is a salt in which at least one of an anion and a cation contains an organic substance. Examples of the organic salt include trimethylamine maleate, triethylamine borodisalicylate, ethyldimethylamine phthalate, mono 1,2,3,4-tetramethylimidazolinium phthalate, and mono 1,3-dimethyl-2 ethylimidazolinium phthalate.

In order to suppress the dedoping of the dopant, the pH of the liquid component (L) may be set to less than 7 or may be set to 5 or less (for example, in a range from 2 to 5, inclusive).

In the electrolytic capacitor, it is important that ESR is low. By using an electrolyte layer containing a conductive polymer doped with a dopant, low ESR can be realized.

Meanwhile, the inventors of the present application have found that, when the electrolyte layer containing the conductive polymer doped with a dopant and the liquid component (L), although initial ESR is low, a deterioration phenomenon in which ESR increases with time largely exhibits. As a result of studying the cause, it has been found that the dopant is likely to be dedoped in the electrolyte layer containing the liquid component (L). It is considered that this dedoping increases ESR with time. Hence, in the electrolytic capacitor containing the liquid component (L), it is important to suppress the increase in ESR with time as compared with a solid electrolytic capacitor not containing the liquid component (L) but containing a solid electrolyte.

Since dedoping hardly occurs in the self-doped first conductive polymer, deterioration of conductivity with time in the electrolyte layer using the self-doped first conductive polymer is small. Thus, when the electrolyte layer contains the first conductive polymer, an increase in ESR with time can be suppressed.

In the electrolytic capacitor of the present disclosure, the dopant may be a dopant containing an acidic group, or may be a polymer dopant containing an acidic group. As a result of studies, the inventors of the present application have newly found that when the dopant containing an acidic group is used, dedoping may significantly occur with an increase in pH. Hence, when a dopant containing an acidic group is used, it is particularly important to suppress an increase in ESR with time.

In the electrolytic capacitor of the present disclosure using the second conductive polymer, the dopant may be a polymer dopant containing an acidic group, and the electrolyte layer may contain an electrolytic solution containing the non-aqueous solvent and a base component dissolved in the non-aqueous solvent. In this case, since dedopant is likely to occur due to the base component, it is particularly important to suppress an increase in ESR with time. As described above, since the electrolytic capacitor of the present disclosure contains the self-doped first conductive polymer, an increase in ESR with time can be suppressed.

Examples of the base component include the base components described above. Examples of the acidic group include a sulfonic acid group and a carboxyl group. The polymer dopant containing an acidic group is a polymer in which at least a part of constituent units contains an acidic group. Examples of such a polymer dopant include the polymer dopants described above.

In the electrolytic capacitor of the present disclosure, a content proportion of the base component in the electrolytic solution may range from 0.1 mass % to 20 mass %, inclusive. When the content proportion of the base component is 0.1 mass % or more, it is particularly important to use the self-doped first conductive polymer. When the content proportion of the base component is set to 20 mass % or less, it is easy to dissolve the base component in the electrolytic solution.

The content proportion of the liquid component (L) in the electrolyte layer may range from 60 mass % to 99 mass %, inclusive (for example, from 70 mass % to 95 mass %, inclusive). The content proportion of the first conductive polymer in the solid component of the electrolyte layer may range from 1 mass % to 100 mass %, inclusive (for example, from 1 mass % to 45 mass %, inclusive). The total content proportion of the second conductive polymer and the dopant in the solid component of the electrolyte layer may range from 1 mass % to 99 mass %, inclusive (for example, from 55 mass % to 99 mass %, inclusive). In the electrolyte layer, a relation of (the mass of the first conductive polymer):(the total mass of the second conductive polymer and the dopant)= 10:90 to 45:55 may be satisfied.

In the electrolytic capacitor of the present disclosure, the total mass of the second conductive polymer and the dopant contained in the electrolyte layer may be greater than the mass of the first conductive polymer contained in the electrolyte layer. That is, the total content proportion (mass %) of the second conductive polymer and the dopant in the electrolyte layer may be greater than the content proportion (mass %) of the first conductive polymer in the electrolyte layer. The conductive polymer doped with a dopant generally has higher conductivity than a self-doped conductive polymer. Thus, by increasing the content proportion of the second conductive polymer doped with the dopant, the initial ESR can be effectively reduced.

Mass W1 (g) of the first conductive polymer contained in the electrolyte layer and total mass W2 (g) of the second conductive polymer and the dopant contained in the electrolyte layer may satisfy a relation of 1<W2/W1, or may satisfy a relation of 1.1≤W2/W1≤9.

The electrolytic capacitor of the present disclosure may satisfy the following condition (1).

(1) The electrolyte layer includes a polymer layer (conductive polymer layer) constituted by the first conductive polymer and a second conductive polymer doped with a dopant. The polymer layer includes a first polymer layer formed on the dielectric layer on the surface of the anode body and a second polymer layer formed on the first polymer layer.

The conductive polymer contained in the first polymer layer and the conductive polymer contained in the second polymer layer may be the same as or different from each other. When both the first and second polymer layers contain the second conductive polymer, the dopant contained in the first polymer layer may be the same as or different from the dopant contained in the second conductive polymer.

In an example, the first polymer layer is constituted by the second conductive polymer doped with the dopant, and the second polymer layer is constituted by the first conductive polymer. In another example, the first polymer layer is constituted by the first conductive polymer, and the second polymer layer is constituted by the second conductive polymer doped with the dopant.

The electrolytic capacitor of the present disclosure may satisfy the above condition (1) and the following conditions (2).

(2) The content proportion (mass %) of the second conductive polymer in the first polymer layer is greater than the content proportion (mass %) of the second conductive polymer in the second polymer layer. In the condition (2), the "content proportion (mass %) of the second conductive polymer" may be replaced with the "total content proportion (mass %) of the second conductive polymer and the dopant".

The above condition (2) may be replaced with a condition (2') that the content proportion (mass %) of the first conductive polymer in the first polymer layer is smaller than the content proportion (mass %) of the first conductive polymer in the second polymer layer. According to the configuration of (2), the content proportion of the second conductive polymer in a portion close to the dielectric layer on the surface of the anode body can be increased. As a result, initial ESR can be reduced.

The electrolytic capacitor of the present disclosure may satisfy the following conditions (A) and (B), or may further satisfy the requirement (C).

(A) the first conductive polymer is poly(3,4-ethylenedioxythiophene) into which a sulfonic acid group is introduced, and is, for example, the polymer described above.

(B) The second conductive polymer is poly(3,4-ethylenedioxythiophene), and the dopant doped in the second conductive polymer is polystyrenesulfonic acid.

(C) Mass W1 (g) of the first conductive polymer contained in the electrolyte layer and total mass W2 (g) of the second conductive polymer and the dopant contained in the electrolyte layer satisfy a relation of 1<W2/W1, and for example, satisfy a relation of 1.1≤W2/W1≤9.

The constituent elements (the anode body, the cathode body, the separator, and the like) of the capacitor element other than the electrolyte are not particularly limited, and known ones may be used. Examples of the first capacitor element will be described below.

(Anode Body)

As the anode body, a metal foil having a dielectric layer formed on a surface of the metal foil may be used. The type of metal constituting the metal foil is not particularly limited. From the viewpoint of easy formation of the dielectric layer, examples of metal constituting the metal foil include a valve metal, such as aluminum, tantalum, niobium, or titanium, and an alloy of a valve metal. Preferred examples are aluminum and an aluminum alloy. Usually, the surface of the anode body is roughened (made porous). The dielectric layer of the anode body is formed on a porous portion (roughened surface). The electrolyte layer is in contact with the dielectric layer of the anode body.

(Cathode Body)

As the cathode body, a metal foil may be used. The type of metal constituting the metal foil is not particularly limited. Examples of metal constituting the metal foil include a valve metal, such as aluminum, tantalum, niobium, or titanium, and an alloy of a valve metal. Preferred examples are aluminum and an aluminum alloy. On a surface of the cathode body may be provided an anodization film, a film of a metal different from the metal that constitutes the cathode body (different type of metal), or a nonmetal film. Examples of the different type of metal and the nonmetal include metals such as titanium and nonmetals such as carbon.

(Separator)

As the separator, a sheet-shaped material that may be impregnated with an electrolyte can be used, and for example, a sheet-shaped material that has insulating properties and may be impregnated with an electrolyte may be used. The separator may be a woven fabric, a nonwoven fabric, or a porous membrane. Examples of a material for the separator include cellulose, polyethylene terephthalate, polybutylene terephthalate, polyphenylenesulfide, vinylon, nylon, aromatic polyamide, polyimide, polyamideimide, polyetherimide, rayon, and glass.

Examples of the constituent elements other than the electrolyte layer of the second capacitor element will be described below. The second capacitor element includes a porous anode body that has a dielectric layer on a surface of the anode body, a cathode layer, and an electrolyte layer disposed between the anode body and the cathode layer.

The porous anode body may be, for example, a porous sintered body obtained by sintering material particles containing a valve metal. The anode body may have a rectangular parallelepiped shape. Examples of the valve metal include titanium (Ti), tantalum (Ta), and niobium (Nb). The material particles may be made of an alloy containing a valve metal. For example, an alloy containing the valve metal, and silicon, vanadium, boron, and the like may be used. The alloy of the valve metal contains the valve metal as a main component and contains, for example, the valve metal in an amount of 50 atom % or more. Alternatively, material particles of a compound containing the valve metal and a typical element such as nitrogen may be used. One of these material particles may be used alone, or two or more of these materials may be mixed for use.

Since the anode body of the second capacitor element is porous, the anode body has a porous portion on the surface of the anode body, and the dielectric layer is formed in the porous portion. The electrolyte layer is in contact with the dielectric layer of the anode body. The dielectric layer is formed, for example, by subjecting a sintered body to be an anode body to an anodizing treatment and growing an oxide film on the surface of the sintered body.

The cathode layer has a current collecting function. The cathode layer is formed, for example, using a conductive material. The cathode layer may be a conductive layer formed to cover the electrolyte layer. The cathode layer may include a carbon layer formed to cover the electrolyte layer and a metal paste layer formed on the carbon layer. The carbon layer may contain conductive carbon material such as graphite and resin. The metal paste layer may contain metal particles (for example, silver) and a resin. The cathode layer can be formed, for example, by applying the above-described material.

(Method for Manufacturing Electrolytic Capacitor)

The method of the present disclosure for manufacturing an electrolytic capacitor will be described below. According to the manufacturing method, the electrolytic capacitor of the present disclosure can be manufactured. The matters described for the electrolytic capacitor of the present disclosure can be applied to the following manufacturing method, and thus redundant description may be omitted. For example, the constituent elements of the capacitor element, and the like have been described above, and thus redundant description may be omitted. The matters described in the manufacturing method below can be applied to the electrolytic capacitor described above.

The manufacturing method according to the present disclosure includes a step (i), a step (ii), and a step (iii). These will be described below.

(Step (i))

The step (i) is a step of preparing a capacitor element precursor that includes an anode body having a dielectric layer on a surface of the anode body. The step (i) may be a step of forming a capacitor element precursor by a known method.

When an electrolytic capacitor including the first capacitor element is manufactured, the step (i) may be a step of forming a capacitor element precursor that includes a foil-shaped anode body having a dielectric layer on a surface of the anode body, a foil-shaped cathode body, and a separator disposed between the anode body and the cathode body. In this case, as described above, the capacitor element precursor may be a wound type or may be a laminated type When the electrolytic capacitor including the second capacitor element is manufactured, the capacitor element precursor may include an anode body (porous anode body) having a dielectric layer on a surface of the anode body and an anode wire partially embedded in the anode body.

(Step (ii))

The step (ii) is a step of forming a polymer layer containing a self-doped first conductive polymer to be adjacent to the dielectric layer by an impregnation treatment.

The polymer layer formed by the step (ii) may contain the first conductive polymer and a second conductive polymer doped with a dopant. That is, the step (ii) may be a step of forming a polymer layer containing the first conductive polymer and a second conductive polymer doped with a dopant to be adjacent to the dielectric layer by an impregnation treatment.

The impregnation treatment of the step (ii) may be an impregnation treatment (x) of impregnating the capacitor element precursor with a liquid (dispersion liquid or solution; hereinafter, the same applies) containing the first conductive polymer and the second conductive polymer doped with the dopant. For example, by immersing the capacitor element precursor in the liquid, the capacitor element precursor can be impregnated with the liquid. By removing (drying) the liquid dispersion medium or solvent with which the capacitor element precursor is impregnated, the polymer layer containing the first conductive polymer and the second conductive polymer doped with the dopant can be disposed to be adjacent to the dielectric layer. The impregnation treatment (x) may be repeated multiple times. In that case, a drying step of removing the liquid dispersion medium or solvent with which the capacitor element precursor is impregnated may be performed before subsequent impregnation treatment (x).

The liquid dispersion medium or solvent is not particularly limited, and a known dispersion medium or solvent may be used. For example, as the dispersion medium or solvent, aqueous liquid containing water may be used, or water may be used.

By adjusting the mass ratio (content proportion) of the first conductive polymer and the mass ratio (content proportion) of the second conductive polymer (and the dopant) in the liquid, the ratio between the first conductive polymer and the second conductive polymer in the electrolyte layer to be formed can be adjusted. For example, by setting the mass ratio (content proportion) of the second conductive polymer (and the dopant) in the liquid to be greater than the mass ratio (content proportion) of the first conductive polymer in the liquid, the mass ratio of the second conductive polymer (and the dopant) in the electrolyte layer can be set to be greater than the mass ratio of the first conductive polymer in the electrolyte layer.

The impregnation treatment of the step (ii) may include an impregnation treatment (y) of impregnating the capacitor element precursor with a first liquid containing the first conductive polymer, and an impregnation treatment (z) of impregnating the capacitor element precursor with a second liquid containing the second conductive polymer doped with the dopant. As for the impregnation treatment (y) and the impregnation treatment (z), the impregnation treatment (z) may be performed before the impregnation treatment (y), the impregnation treatment (y) may be performed before the impregnation treatment (z), or the impregnation treatment (y) and the impregnation treatment (z) may be performed simultaneously. In a preferred example, the impregnation treatment (y) is performed after the impregnation treatment (z) is performed. The impregnation treatment (y) and the impregnation treatment (z) may be each independently repeated multiple times. A drying step of removing the impregnated liquid dispersion medium (or solvent) may be performed after each of the impregnation treatment (y) and the impregnation treatment (z).

For the dispersion media (or solvents) of the first and second liquids, and the impregnation method in the impregnation treatment (y) and the impregnation treatment (z), the dispersion medium (or solvent) and the impregnation method described in the impregnation treatment (x) may be applied.

In an example, the first liquid does not contain the second conductive polymer doped with the dopant, and the second liquid does not contain the first conductive polymer. However, the first liquid may contain the second conductive polymer doped with the dopant, and the second liquid may contain the first conductive polymer.

After one of the impregnation treatment (y) and the impregnation treatment (z) is performed, drying may be performed, and then the other of the impregnation treatment (y) and the impregnation treatment (z) may be performed. By doing so, a polymer layer including the first polymer layer and the second polymer layer can be formed. By adjusting the type and content proportion of the conductive polymer (and the dopant) in the first liquid and the type and content proportion of the conductive polymer (and the dopant) in the second liquid, the type and content proportion of the conductive polymer (and the dopant) in the first polymer layer and the type and content proportion of the conductive polymer (and the dopant) in the second polymer layer can be adjusted.

(Step (iii))

The step (iii) is a step of impregnating the polymer layer formed in the step (ii) with a non-aqueous solvent. As a result, an electrolyte layer containing the self-doped first conductive polymer and the non-aqueous solvent is formed. The step (iii) may be a step of impregnating the polymer layer formed in the step (ii) with an electrolytic solution (containing a non-aqueous solvent). That is, the step (iii) may be a step of impregnating the polymer layer formed in the step (ii) with the liquid component (L).

When the polymer layer formed in the step (ii) contains the second conductive polymer doped with the dopant, an electrolyte layer containing the self-doped first conductive polymer, the second conductive polymer doped with the dopant, and the non-aqueous solvent is formed by the step (iii).

The impregnation method in the step (iii) is not particularly limited, and a known method may be used. For example, after the step (ii), the capacitor element precursor may be immersed in the non-aqueous solvent (or the electrolytic solution). As the non-aqueous solvent (or the electrolytic solution) used in the step (iii), those described above can be applied.

In the manufacturing method of the present disclosure, the dopant may be a polymer dopant containing an acidic group, and the step (iii) may be a step of impregnating the polymer layer with an electrolytic solution containing the non-aqueous solvent and a base component dissolved in the non-aqueous solvent.

The first capacitor element is obtained by the step (iii). Alternatively, the anode body and the electrolyte layer of the second capacitor element are obtained by the step (iii). After the step (iii), an electrolytic capacitor may be produced using the constituent elements obtained in the step (iii). This step is not particularly limited, and a known method can be used.

Hereinafter, an example of the electrolytic capacitor according to the present disclosure will be specifically described with reference to the drawings; however, the electrolytic capacitor of the present disclosure is not limited to the following drawings. The above-described constituent elements can be applied to constituent elements of the electrolytic capacitor as the example to be described below. The constituent elements of the electrolytic capacitor as the example to be described below can be changed based on the above-described description. Matters to be described below may be applied to the above-described exemplary embodiment. Similar parts will be denoted by the common reference marks and redundant description may be omitted.

FIRST EXEMPLARY EMBODIMENT

Figure 2:
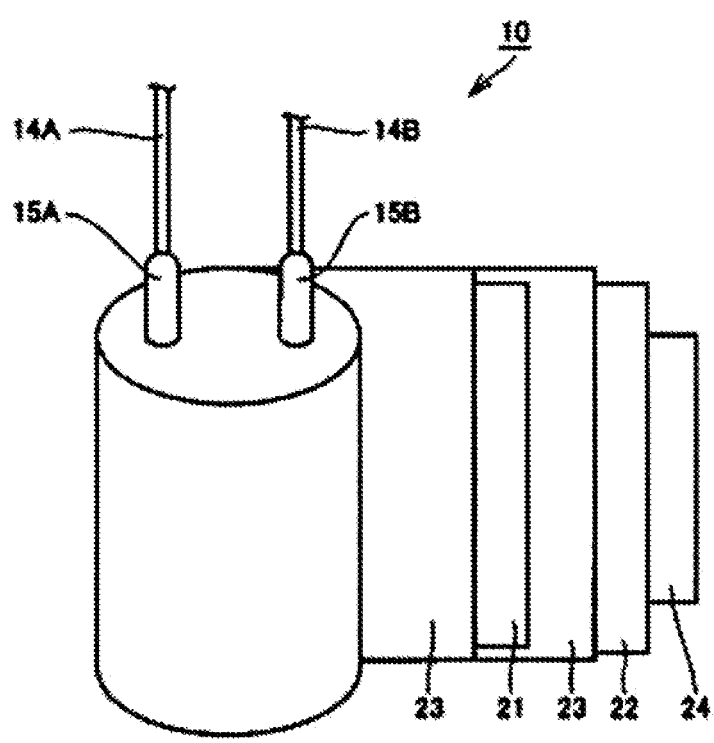
FIG. 2 is a view schematically illustrating a part of the electrolytic capacitor illustrated in FIG. 1.

In the first exemplary embodiment, an example of the electrolytic capacitor according to the present disclosure will be described. This electrolytic capacitor is an electrolytic capacitor including the first capacitor element. FIG. 1 schematically illustrates a cross-section of an example of electrolytic capacitor 100 of the first exemplary embodiment. FIG. 2 is a schematic view of a partially developed capacitor element 10 included in electrolytic capacitor 100 illustrated in FIG. 1.

As illustrated in FIG. 1, electrolytic capacitor 100 includes capacitor element 10, bottomed case 11 that houses capacitor element 10, sealing member 12 that closes an opening of bottomed case 11, seat plate 13 that covers sealing member 12, lead wires 14A and 14B led out from sealing member 12 and penetrating seat plate 13, lead tabs 15A and 15B respectively connecting lead wires 14A and 14B and electrodes of capacitor element 10. Capacitor element 10 is housed in bottomed case 11. Bottomed case 11 is, at a part near an opening end, processed inward by drawing, and is, at the opening end of bottomed case 11, curled to swage sealing member 12.

With reference to FIG. 2, capacitor element 10 includes foil-shaped anode body 21 having a dielectric layer on a surface of the anode body, foil-shaped cathode body 22, and separator 23 and an electrolyte layer (not illustrated) disposed between the anode body and the cathode body. Anode body 21 and cathode body 22 are wound with separator 23 disposed between the anode body and the cathode body. The outermost circumference of the wound body is fixed with winding stop tape 24. FIG. 2 illustrates the wound body that is partially developed before the outermost circumference of the wound body is fixed.

EXAMPLES

Hereinafter, an exemplary embodiment of the present disclosure will be described in more detail by means of Examples.

Example 1

In Example 1, a plurality of electrolytic capacitors (capacitors A1 to A7 and capacitor C1) were produced and evaluated. The methods for manufacturing and evaluating these capacitors will be described below. In the description of the method for producing a capacitor of Comparative Example, conditions different from the conditions of the step (ii) and the step (iii) described above may be used, but for convenience, these are also described as the step (ii) and the step (iii).

[Production of Capacitor A1]

A capacitor A1 is a wound-type electrolytic capacitor having a rated voltage of 35 V and a rated capacitance of 270 g. The capacitor A1 was produced by the following procedure.

(Preparation of Cathode Body)

An aluminum foil (Al foil) having a thickness of 70 μm was used for the cathode body.

(Preparation of Anode Body)

An Al foil having a thickness of 120 μm was prepared. The Al foil was subjected to a direct current etching treatment to roughen a surface. Next, the Al foil was subjected to an anodizing treatment to form a dielectric layer (thickness: about 70 nm), thereby obtaining an anode body. A dielectric layer was formed by performing an anodizing treatment at 70° C. for 30 minutes while applying a voltage of 50 V to the Al foil with the Al foil immersed in an ammonium adipate solution. Then, the anode body was cut into a predetermined size to prepare an anode body of the capacitor A1.

(Preparation of Liquid Containing Self-Doped First Conductive Polymer)

As the liquid containing the self-doped first conductive polymer, the following aqueous solution was prepared.

(Liquid AL Containing Conductive Polymer A)

An aqueous solution (liquid AL) containing poly(4-(2,3-dihydrothieno-[3,4-b][1,4]dioxin-2-ylmethoxy)-1-propanesulfonic acid) as conductive polymer A at a concentration of 5 mass % was prepared.

(Liquid BL Containing Conductive Polymer B)

An aqueous solution (liquid BL) containing N-position substituted sulfonated polyaniline as conductive polymer B at a concentration of 5 mass % was prepared.

(Preparation of PEDOT:PSS Dispersion Liquid)

A dispersion liquid of the second conductive polymer doped with the dopant was prepared by the following method. These mixed solutions were prepared by dissolving 3,4-ethylenedioxythiophene and polystyrenesulfonic acid as a dopant in ion-exchanged water. While the obtained mixed solution was being stirred, iron(III) sulfate (oxidant) that had been dissolved in ion-exchanged water was added to the mixed solution to cause a polymerization reaction. After the reaction, the obtained reaction solution was dialyzed to remove unreacted monomers and an excessive oxidant, thereby obtaining a dispersion liquid containing poly(3,4-ethylenedioxythiophene) doped with about 5 mass % of polystyrenesulfonic acid (PSS). Hereinafter, poly(3,4-ethylenedioxythiophene) doped with about 5 mass % of polystyrenesulfonic acid (PSS) may be referred to "PEDOT:PSS". The dispersion liquid in which PEDOT:PSS is dispersed may be referred to "PEDOT:PSS dispersion liquid". In this way, a PEDOT:PSS dispersion liquid having a content proportion of PEDOT:PSS of 2 mass % was prepared.

(Production of Wound Body (Step (i)))

An anode lead tab and a cathode lead tab to which a lead wire was connected were connected to the prepared anode body and cathode body, respectively. The anode body and the cathode body were wound with the separator interposed between the anode body and the cathode body, and the outer surface was fixed with a winding stop tape. As the separator, a nonwoven fabric made of cellulose was used. In this way, a wound body (capacitor element precursor) was produced. A dielectric layer was formed mainly on an end surface of the anode body by performing a re-anodizing treatment at 70° C. for 60 minutes while applying a voltage of 50 V to the anode body with the produced wound body immersed in an ammonium adipate solution.

(Step (ii))

First, liquid AL containing self-doped conductive polymer A described above was disposed in a container. Next, the wound body was immersed in liquid AL in the container for 15 minutes at room temperature in a reduced pressure atmosphere (40 kPa), and then the wound body was pulled up from liquid AL. In this way, the wound body was impregnated with liquid AL. Then, the wound body was dried in a drying furnace at 60° C. for 30 minutes, and subsequently dried at 150° C. for 15 minutes. Thus, liquid AL was dried. In this way, the polymer layer (conductive polymer layer) was formed.

(Impregnation with Electrolytic Solution)

After the step (iii), the wound body was impregnated with the electrolytic solution at room temperature under atmospheric pressure. As the electrolytic solution, a solution obtained by mixing polyethylene glycol, γ-butyrolactone, sulfolane, and mono(ethyldimethylamine) phthalate (solute) at a mass ratio of polyethylene glycol:γ-butyrolactone:sulfolane:mono(ethyldimethylamine) phthalate=30:30:20:20 was used. In this way, the capacitor element including the electrolyte layer was obtained. This capacitor element was sealed to complete the electrolytic capacitor. Then, an aging treatment was performed at 130° C. for 2 hours while rated voltage was being applied. In this way, capacitor A1 was obtained.

[Production of Capacitors A2 to A7]

Capacitors A2 to A7 were produced under the same materials and conditions as in capacitor A1, except that a liquid used in the step (ii) was different. In the production of capacitors A2 to A7, a mixed liquid of liquid AL containing self-doped conductive polymer A described above and the PEDOT:PSS dispersion liquid was used as the liquid used in the step (ii). Then, capacitors A2 to A7 were produced by changing the ratio between the mass of the self-doped conductive polymer and the mass of PEDOT:PSS in the mixed liquid (dispersion liquid). This mass ratio directly corresponds to the mass ratio of the self-doped conductive polymer and PEDOT:PSS in the electrolyte layer to be formed.

[Production of Capacitor C1]

Capacitor C1 was produced under the same materials and conditions as in capacitor A1, except that a liquid used in the step (ii) was different. In the production of capacitor C1, the above-described PEDOT:PSS dispersion liquid was used as the liquid used in the step (ii). Thus, the electrolyte layer of capacitor C1 contained PEDOT:PSS and did not contain the self-doped conductive polymer.

[Production of Capacitors B1 to B7]

Capacitors B1 to B7 were produced under the same materials and conditions as in capacitors A1 to A7, except that a liquid used in the step (ii) was different. In the production of capacitors B1 to B7, liquid BL was used instead of liquid AL.

(Measurement of ESR)

The equivalent series resistance (ESR) of the electrolytic capacitor produced as described above was measured. ESR was measured using an LCR meter for four-terminal measurement in an environment of 20° C. As for ESR, an initial value after production and a value after the electrolytic capacitor was left to stand at a high temperature (left to stand at 165° C. for 500 hours) were measured. As an index of the long-term property, a long-term property evaluation value F was determined by the following formula.

Long-term property evaluation value $F$=(ESR value after being left to stand)/(Initial ESR value)

In the electrolyte layer of the electrolytic capacitor, the ratio between the mass of the self-doped conductive polymer and the mass of PEDOT:PSS is shown in Tables 1 and 2. The evaluation results of ESR of the electrolytic capacitor are shown in Tables 1 and 2.

TABLE 1

| Capacitor | Mass ratio (%) of polymer in electrolyte layer | | ESR | | |
|---|---|---|---|---|---|
| | Self-doped conductive polymer A | PEDOT:PSS | Initial (mΩ) | After being left to stand at high temperature (mΩ) | Long-term property evaluation value F |
| A1 | 100 | 0 | 122 | 237 | 1.94 |
| A2 | 80 | 20 | 27 | 42 | 1.55 |
| A3 | 60 | 40 | 23 | 36 | 1.57 |
| A4 | 45 | 55 | 17 | 19 | 1.12 |
| A5 | 30 | 70 | 15 | 19 | 1.27 |
| A6 | 20 | 80 | 13 | 20 | 1.54 |
| A7 | 10 | 90 | 12 | 21 | 1.75 |
| C1 | 0 | 100 | 11 | 23 | 2.09 |

TABLE 2

| Capacitor | Mass ratio (%) of polymer in electrolyte layer | | ESR | | |
|---|---|---|---|---|---|
| | Self-doped conductive polymer B | PEDOT:PSS | Initial (mΩ) | After being left to stand at high temperature (mΩ) | Long-term property evaluation value F |
| B1 | 100 | 0 | 312 | 611 | 1.96 |
| B2 | 80 | 20 | 73 | 133 | 1.82 |
| B3 | 60 | 40 | 27 | 41 | 1.52 |
| B4 | 45 | 55 | 16 | 19 | 1.19 |
| B5 | 30 | 70 | 15 | 21 | 1.40 |
| B6 | 20 | 80 | 15 | 22 | 1.47 |
| B7 | 10 | 90 | 14 | 23 | 1.64 |
| C1 | 0 | 100 | 11 | 23 | 2.09 |

As shown in Tables 1 and 2, capacitors A1 to A7 and B1 to B7 of the present disclosure had a small value of the evaluation value F. That is, in these capacitors, the increase ratio of ESR by the capacitors being left to stand at a high temperature for a long period of time was small. In the electrolyte layer, when (the mass of the first conductive polymer):(the total mass of the second conductive polymer and the dopant) is 10:90 to 45:55, ESR was low in both the initial stage and after the capacitor was left to stand at a high temperature for a long period of time.

Example 2

In Example 2, a plurality of electrolytic capacitors (capacitors A8 and A9) were produced and evaluated. The methods for manufacturing and evaluation these capacitors will be described below.

[Capacitor A8]

Capacitor A8 was produced under the same materials and conditions as in capacitor A1, except that the step (ii) was different. In the step (ii) of capacitor A8, the above-described impregnation treatment (y) was performed after the above-described impregnation treatment (z) was performed. The step (ii) of capacitor A8 will be described below.

(Impregnation Treatment (z) and Drying Step)

Specifically, first, the dispersion liquid of PEDOT:PSS was disposed in a container. Then, the wound body formed in the step (i) was immersed in the dispersion liquid in the container for 5 minutes at room temperature in a reduced pressure atmosphere (40 kPa), and then the wound body was pulled up from the dispersion liquid. In this way, the wound body was impregnated with the dispersion liquid. Then, the wound body was dried in a drying furnace at 60° C. for 30 minutes, and subsequently dried at 155° C. for 15 minutes. Thus, the dispersion liquid was dried. In this way, the first polymer layer constituted by PEDOT:PSS was formed.

(Impregnation Treatment (y) and Drying Step)

Next, impregnation with liquid AL and drying of liquid AL were performed under the same conditions as in the formation of the first polymer layer, except that liquid AL containing self-doped conductive polymer A described above was used instead of the dispersion liquid of PEDOT:PSS. In this way, the second polymer layer constituted by self-doped conductive polymer A was formed.

As described above, the step (ii) was performed. An electrolyte layer including the first polymer layer (PEDOT:PSS layer) formed on the dielectric layer of the anode body and the second polymer layer (self-doped conductive polymer layer) formed on the first polymer layer was formed by the step (ii).

[Capacitor A9]

Capacitor A9 was produced under the same materials and conditions as in capacitor A8, except that the order of the impregnation treatment (z) and the impregnation treatment (y) was reversed. That is, in the step (ii) of capacitor A9, the impregnation treatment (z) was performed after the impregnation treatment (y) was performed. The drying step was performed under the same conditions as in the drying step of capacitor A8.

As described above, the step (ii) was performed. An electrolyte layer including the first polymer layer (self-doped conductive polymer layer) formed on the dielectric layer of the anode body and the second polymer layer (PEDOT:PSS layer) formed on the first polymer layer was formed by the step (ii).

ESR of the electrolytic capacitor produced as described above was measured under the same conditions as in capacitor A1. Evaluation results are shown in Table 3.

TABLE 3

| | Polymer layer included in electrolyte layer | | | ESR | |
|---|---|---|---|---|---|
| Capacitor | First polymer layer | Second polymer layer | Initial (mΩ) | After being left to stand at high temperature (mΩ) | Long-term property evaluation value F |
| A8 | PEDOT:PSS | Self-doped | 10 | 17 | 1.70 |
| A9 | Self-doped | PEDOT:PSS | 11 | 15 | 1.36 |

As shown in Table 3, both capacitors A8 and A9 had low values of ESR and the evaluation value F. When capacitors A8 and A9 were compared with each other, the evaluation value F of capacitor A9 was lower.

The present disclosure relates to an electrolytic capacitor and a method for manufacturing an electrolytic capacitor.

What is claimed is:

1. An electrolytic capacitor comprising a capacitor element, wherein:
   the capacitor element includes an anode body and an electrolyte layer, the anode body having a dielectric layer on a surface of the anode body, the electrolyte layer being disposed adjacent to the dielectric layer,
   the electrolyte layer contains a first conductive polymer, a second conductive polymer doped with a dopant, and a non-aqueous solvent, the first conductive polymer being a self-doped conductive polymer, and
   the following relation is satisfied, $1.1 \leq W2/W1 \leq 9$, where W1 represents a mass of the first conductive polymer contained in the electrolyte layer, and W2 represents a total mass of the second conductive polymer and the dopant contained in the electrolyte layer.

2. The electrolytic capacitor according to claim 1, wherein the dopant is a polymer dopant containing an acidic group, and
   the electrolyte layer contains an electrolytic solution containing the non-aqueous solvent and a base component dissolved in the non-aqueous solvent.

3. The electrolytic capacitor according to claim 2, wherein a proportion of the base component in the electrolytic solution ranges from 0.1 mass % to 20 mass %, inclusive.

4. The electrolytic capacitor according to claim 1, wherein the following relation is satisfied, $1.2 \leq W2/W1 \leq 9$ is satisfied.

5. The electrolytic capacitor according to claim 1, wherein:
   the electrolyte layer includes a polymer layer constituted by the first conductive polymer and the second conductive polymer, the second conductive polymer being doped with the dopant,
   the polymer layer includes a first polymer layer and a second polymer layer, the first polymer layer being disposed on the dielectric layer, the second polymer layer being disposed on the first polymer layer, and
   a content proportion of the second conductive polymer in the first polymer layer is greater than a content proportion of the second conductive polymer in the second polymer layer.

6. The electrolytic capacitor according to claim 1, wherein the dopant is polystyrenesulfonic acid, and
   the second conductive polymer is poly(3,4-ethylenedioxythiophene).

* * * * *